Dec. 13, 1949 F. T. BLAYDES ET AL 2,491,153
AGRICULTURAL IMPLEMENT
Filed June 15, 1946 2 Sheets-Sheet 2
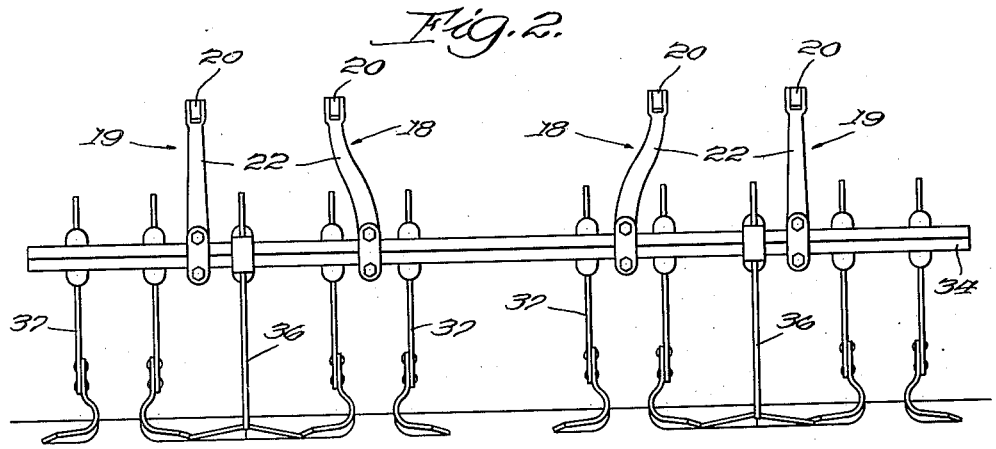
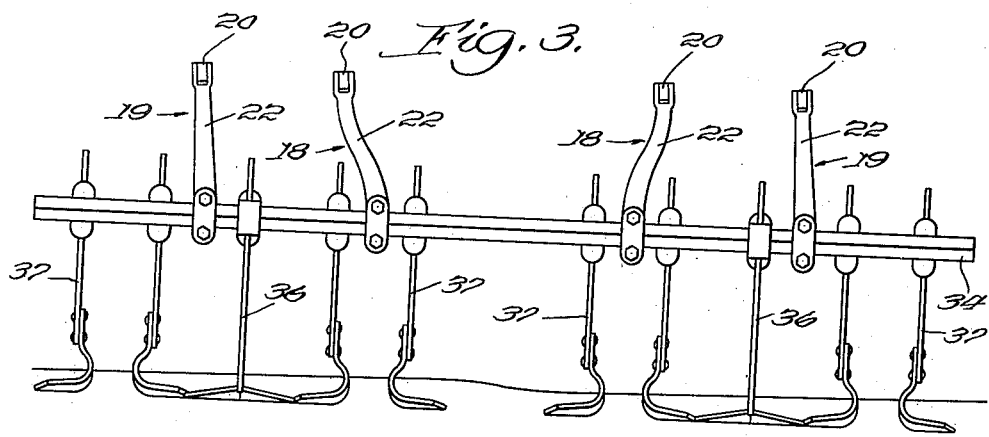
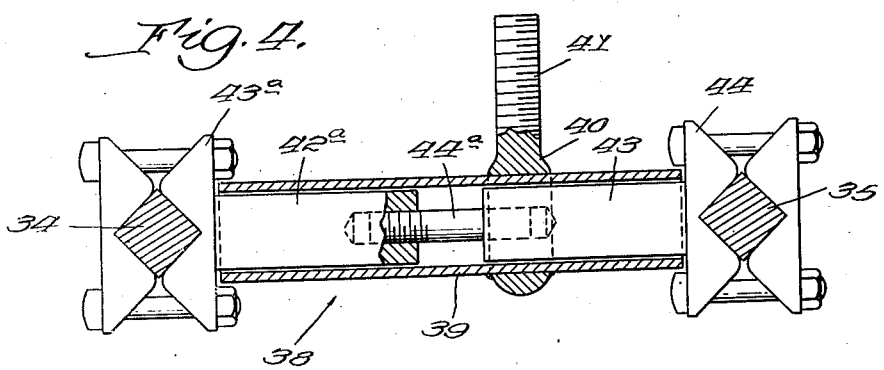
Inventors:
Frederick T. Blaydes
and Jack L. Bauman.
By Paul O. Pippel, Atty.

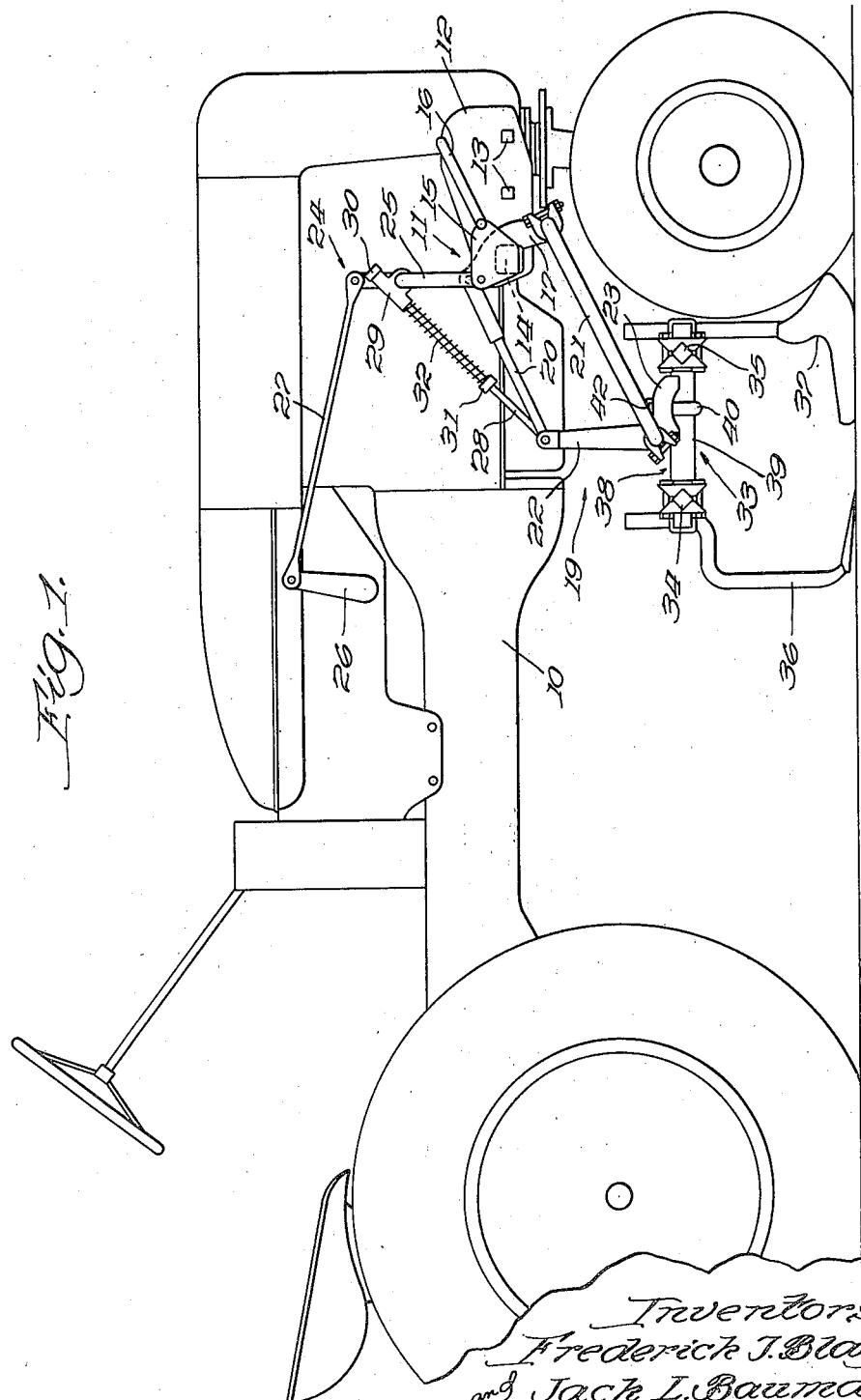

Patented Dec. 13, 1949

2,491,153

UNITED STATES PATENT OFFICE 2,491,153

AGRICULTURAL IMPLEMENT

Frederick T. Blaydes and Jack L. Bauman, Canton, Ill., assignors to International Harvester Company, a corporation of New Jersey Application June 15, 1946, Serial No. 677,011

4 Claims. (Cl. 97—50)

This invention relates to agricultural implements and particularly to implements adapted to be mounted on a tractor or other support. More specifically the invention concerns implements of the tool-bar type.

An object of this invention is to provide improved means for attaching an implement to a tractor or other support.

Another object of the invention is to provide improved means for mounting upon a tractor an implement of the transverse tool-bar type wherein means are provided for accommodating independent vertical floating movement of the ends of the tool bar in order that the earth-working tools may properly follow the contour of the ground. In the absence of such provision, of course, the ends of a tool-bar implement will not properly follow the ground, and upon encountering an uneven surface the tools at one end of the tool bar may operate at a shallower depth than the tools at the other end or may ride entirely out of the ground.

Another object of the invention is to provide in a tractor-mounted implement of the transverse tool-bar type, means for pivotally connecting the tool bar to the lifting mechanism therefor for movement thereof about longitudinal axes located at spaced points on the bar.

Another object of the invention is to provide in a vegetable cultivator of the double tool-bar type novel means for connecting the tool bars together to facilitate assembly and replacement of parts.

Other objects and advantages of the invention will become clear from the following detailed description when read in conjunction with the accompanying drawings, wherein:

Figure 1 is a view in side elevation of a tractor having mounted thereupon an implement embodying the features of the present invention;

Figure 2 is an elevation of the implement traveling over level ground and showing a portion of the lifting mechanism by which the implement is mounted upon the tractor;

Figure 3 is an elevation similar to Figure 2 but showing the position of the tool-bar implement when traveling over uneven ground; and Figure 4 is an enlarged detail in section showing the connecting means between the tool bars.

Referring to the drawings, the implement of the present invention is shown mounted upon a tractor 10. Although only one side of the tractor is shown, is may be understood that on each side is mounted a supporting structure generally indicated at 11, each of which includes a plate 12 secured to the side of the tractor adjacent the front end thereof by bolts 13 and having projecting laterally therefrom a square supporting beam 14. To the outer end of the beam is affixed a plate 15 and the beam is braced by a strap 16 secured to the plates 12 and 15.

Secured to the beam 14 is a bracket 17. While only one of these brackets is shown in the drawing it may be understood that two such brackets are mounted upon the beam on each side of the tractor. Each of the brackets 17 on the beams 14 at opposite sides of the tractor serves to support implement lifting assemblies, the inner assemblies being designated in Figures 2 and 3 by the numeral 18 and the outer assemblies by the numeral 19. Each of these lifting assemblies comprises a pair of vertically spaced generally parallel links 20 and 21 pivotally connected at their forward ends at vertically spaced locations on the bracket 17. The rear ends of the links 20 and 21 are pivotally connected at vertically spaced locations to a standard 22, at the lower end of which is a base portion 23 extending at right angles thereto. The parallel links 20 and 21 are raised and lowered about their pivots upon the bracket 17 by a rockable structure generally indicated at 24 and comprising a bail 25 rocked by a rock arm 26 mounted upon the tractor and connected to the bail by a connecting rod 27. A rock arm similar to 26 is mounted upon the opposite side of the tractor and is similarly connected to the parallel link lifting assemblies on that side of the tractor. Each of the rock arms 26 is rocked by a mechanism not shown but preferably by power means deriving energy from the tractor power plant.

Since each of the lifting assemblies 18 and 19 is individually pivotally mounted upon its respective bracket 17 upon the beam 14, it is understood that each lifting assembly may rise and fall independently of the other. Each lifting assembly is flexibly connected to the rockable structure 24 by means of a push rod 28, the upper end of which is pivoted upon the bail 25 and the lower end upon the standard 22. The upper end of the rod is slidably received in a sleeve 29 which serves for the pivotal connection of the rod to the bail, and the end of the rod projecting through the sleeve 29 has secured thereto a collar 30 to limit the movement of the rod in one direction with respect to the sleeve 29. The lower portion of the rod 28 has adjustably secured thereto a collar 31, and a spring 32 surrounds the rod between the collar 31 and the sleeve 29 so that upward movement of the lifting assemblies 18 and 19 is against the action of the springs 32.

The earth-working implement of the present invention is generally indicated by the numeral 33 and comprises a pair of longitudinally spaced, transversely extending tool bars 34 and 35. These tool bars extend transversely from one side of the tractor to the other between the front and rear wheels thereof. Mounted upon the tool bar 34 is a plurality of earth-working tools 36, and upon the tool bar 35 a number of tools 37, clearly shown in Figures 2 and 3.

The tool bars 34 and 35 are connected by a clamping structure generally indicated at 38, one of which is provided for each of the lifting structures 18, 19. Each clamping structure 38 comprises a cylindrical sleeve member 39 having secured thereto an eye-bolt 40 having a threaded shank 41 adapted to be received in an opening in the base portion 23 of the standard 22, the lower surface of the base 23 being shaped to fit the contour of the sleeve 39. A nut 42 is provided upon the shank 41 for securing the sleeve 39 to the standard 22.

Rotatably mounted in the sleeve 39 are a pair of shaft members 42$^a$ and 43, the ends of which project from the sleeve 39 and are provided at their ends with clamps 43$^a$ and 44, respectively. Each of the clamps 43$^a$ and 44 is notched to receive the square tool bars 34 and 35. The tool bars 34 and 35 are thus rockable about longitudinal axes represented by the shafts 42$^a$ and 43.

The inner ends of the shafts 42$^a$ and 43 are connected by a stud bolt 44$^a$, the ends of which are threaded for reception in threaded openings in the inner ends of the shafts. It is therefore a relatively simple matter to remove one or both of the shafts 42$^a$ or 43 to replace implement parts or for repair purposes.

In Figure 2 the implement is shown traveling over level ground, while in Figure 3 the ground at the right side of the tractor is lower than that at the left side thereof. In prior tool-bar implement constructions no provision has been made for leveling such an implement with respect to the surface of the ground over which it is traveling so that the tool bar remains substantially rigid with respect to the tractor, and when uneven ground is encountered, as for example that shown in Figure 3, the tools on the right-hand end of the tool bar would not travel at the same depth as those on the left-hand end thereof so that uniform operation could not be obtained. The tool bar is shown to have rotated about the connections thereof to the brackets 22 to accommodate the implement to the contour of the ground. Thus the tools at the right-hand end of the implement are permitted to travel at the same depth as the tools at the left-hand end so that uniform operation is assured.

The slight twisting of the standards 22 incident to the turning of the tool bars 34 and 35 upon the shafts 42$^a$ and 43 is accommodated by providing a small amount of play in the pivotal connections of the parallel links 20 and 21 to the brackets 17 and 22.

The operation of the implement of the present invention should be clearly understood from the foregoing description. Modifications may, however, be made therein without departing from the spirit of the invention or the scope of the appended claims.

What is claimed is:

1. In an agricultural implement comprising a support, a pair of longitudinally spaced transverse tool bars and earth-working tools caried by each of said bars, connecting means between said bars at spaced locations thereon, each said connecting means comprising a sleeve member, a pair of shaft members rotatably received in said sleeve and projecting from opposite ends thereof, a threaded bolt separably connecting the inner ends of said shafts, clamps secured to the outer ends of the shaft for connection to the respective tool bars, and lift linkage on the support connected to said sleeves for raising and lowering said tool bars.

2. In an agricultural implement comprising a support and laterally spaced lifting members mounted on the support for independent generally vertical movement with respect thereto, a longitudinally extending sleeve member carried by each said lifting member, a shaft rotatable in the sleeve having clamping means secured to forward and rearward ends thereof, and a pair of rigid tool-carrying members extending between said lifting members and connected respectively to said forward and rearward clamping means.

3. For use with a tractor having lifting members mounted thereon at transversely spaced locations for independent movement generally vertically relative to the tractor and an agricultural implement mounted thereupon including a pair of longitudinally spaced transverse tool carrying bars, means connecting said bars at spaced locations thereon comprising sleeve members extending between said bars, a pair of shafts rotatable in each said sleeve and projecting from opposite ends thereof, means for securing the projecting ends of said shafts to said bars, means separably connecting the inner ends of said shafts, and means connecting the lifting members to said sleeves.

4. For use with a tractor having lifting members mounted thereon at transversely spaced locations for independent movement generally vertically relative to the tractor and an agricultural implement mounted thereupon including a pair of longitudinally spaced transverse tool-carrying bars, means connecting said bars at spaced locations thereon comprising sleeve members extending between said bars, a pair of shafts rotatable in each said sleeve and projecting from opposite ends thereof, means for securing the projecting ends of said shafts to said bars, the inner ends of the shafts having threaded openings therein, a stud bolt having its ends threaded for reception in said openings, and means connecting the lifting members to said sleeves.

FREDERICK T. BLAYDES.
JACK L. BAUMAN.

REFERENCES CITED

The following references are of record in the file of this patent:

UNITED STATES PATENTS

| Number | Name | Date |
|---|---|---|
| 2,150,665 | Tuft | Mar. 14, 1939 |
| 2,332,616 | Tuft | Oct. 26, 1943 |
| 2,369,759 | Smith | Feb. 20, 1945 |
| 2,417,905 | Blaydes | Mar. 25, 1947 |

FOREIGN PATENTS

| Number | Country | Date |
|---|---|---|
| 20,236/29 | Australia | May 16, 1930 |